United States Patent
Mueller et al.

(10) Patent No.: US 10,115,986 B2
(45) Date of Patent: Oct. 30, 2018

(54) METHOD FOR CHANGING A FUEL CELL SYSTEM OVER TO A STANDBY MODE AS WELL AS SUCH A FUEL CELL SYSTEM

(71) Applicant: Volkswagen AG, Wolfsburg (DE)

(72) Inventors: Johannes Mueller, Uetze (DE); Martin Arendt, Hamburg (DE)

(73) Assignee: Volkswagen AG, Wolfsburg (DE)

( * ) Notice: Subject to any disclaimer, the term of this patent is extended or adjusted under 35 U.S.C. 154(b) by 385 days.

(21) Appl. No.: 14/995,018

(22) Filed: Jan. 13, 2016

(65) Prior Publication Data
US 2016/0204456 A1    Jul. 14, 2016

(30) Foreign Application Priority Data
Jan. 14, 2015   (DE) .................... 10 2015 200 473

(51) Int. Cl.
*H01M 8/04* (2016.01)
*H01M 8/04228* (2016.01)
(Continued)

(52) U.S. Cl.
CPC ..... *H01M 8/04228* (2016.02); *H01M 8/0494* (2013.01); *H01M 8/04104* (2013.01); *H01M 8/04753* (2013.01); *H01M 2250/20* (2013.01)

(58) Field of Classification Search
CPC ......... H01M 8/04228; H01M 8/04104; H01M 8/04753; H01M 8/0494; H01M 2250/20; H01M 8/04223
See application file for complete search history.

(56) References Cited

U.S. PATENT DOCUMENTS 8,129,055 B2 * 3/2012 Igarashi ............ H01M 8/04223
429/414
9,034,529 B2 * 5/2015 Mueller ............ H01M 8/04097
429/414
(Continued)

FOREIGN PATENT DOCUMENTS

DE   10 2004 034 071   2/2006
DE   10 2009 001 630   9/2010
EP       2 564 459 B1   3/2013

*Primary Examiner* — Renee Luebke
*Assistant Examiner* — Paul Baillargeon
(74) *Attorney, Agent, or Firm* — Davidson, Davidson & Kappel, LLC

(57) ABSTRACT

A method for changing a fuel cell system from a normal mode of operation over to a standby mode comprises the following steps:
a) reducing the load withdrawal—via the electric circuit of the fuel cell stack—down to a load within the range from −1% to +5% around a load with an optimal system efficiency,
b) regulating down the anode pressure down via the anode supply system,
c) in the meantime, maintaining and controlling the cathode gas feed via the cathode supply system so that the pressure differential between the anode spaces and the cathode spaces does not exceed a prescribed maximum pressure differential,
d) switching off the cathode gas feed if the pressure differential between the anode spaces and of the fuel cell stack and the environment has reached the prescribed maximum pressure differential, and
e) switching off the load withdrawal via the external electric circuit at the latest when a prescribed minimum limit voltage of the fuel cell stack has been reached.

12 Claims, 3 Drawing Sheets

(51) Int. Cl.
  *H01M 8/04746* (2016.01)
  *H01M 8/04828* (2016.01)
  *H01M 8/04089* (2016.01)

(56) References Cited

U.S. PATENT DOCUMENTS

2011/0097636 A1   4/2011   Kurrle et al.
2011/0250516 A1   10/2011  Tsukada et al.
2013/0065147 A1   3/2013   Autenrieth

* cited by examiner

METHOD FOR CHANGING A FUEL CELL SYSTEM OVER TO A STANDBY MODE AS WELL AS SUCH A FUEL CELL SYSTEM

This claims the benefit of German Patent Application DE 10 2015 200 473.2, filed Jan. 14, 2015 and hereby incorporated by reference herein.

The invention relates to a method for changing a fuel cell system from a normal mode of operation over to a standby mode as well as to a such a fuel cell system designed to carry out the method.

BACKGROUND

Fuel cells utilize the chemical reaction of a fuel with oxygen to form water in order to generate electric energy. For this purpose, the core component of fuel cells is the so-called membrane electrode assembly (MEA), which consists of an ion-conductive (usually proton-conductive) membrane and an electrode (anode and cathode) arranged on each side of the membrane. Moreover, it is also possible to arrange gas diffusion layers (GDL) on both sides of the membrane electrode assembly on the sides of the electrodes facing away from the membrane. As a rule, the fuel cell is formed by a plurality of stacked MEAs whose electric outputs are cumulative. As a rule, there are bipolar plates (also called flow field plates) arranged between the individual membrane electrode assemblies and they ensure that the individual cells are supplied with the operating media, in other words, the reactants, in addition to which they also serve for cooling purposes. Moreover, the bipolar plates establish an electrically conductive contact with the membrane electrode assemblies.

During the operation of a polymer electrolyte membrane (PEM) fuel cell, the fuel, especially hydrogen $H_2$ or a gas mixture containing hydrogen, is fed to the anode via a flow field of the bipolar plate that is open on the anode side, where an electrochemical oxidation of $H_2$ to form $H^+$ takes place while electrons are released. A (hydrous or anhydrous) transport of the protons $H^+$ from the anode space into the cathode space takes place via the membrane which separates the reaction spaces and electrically insulates them from each other in a gas-tight manner. The electrons provided on the anode are fed to the cathode via an external electric circuit. Oxygen or a gas mixture containing oxygen (for instance, air) is fed to the cathode via a flow field of the bipolar plate that is open on the cathode side so that a reduction of $O_2$ to form $O^{2-}$ takes place while electrons are picked up. At the same time, the oxygen anions react in the cathode space with the protons that have been transported via the membrane, a process in which water is formed. The electric potential generated by the chemical reactions can be tapped via the external electric circuit in order to supply an electric consumer or to charge a battery.

In order to supply a fuel cell stack with its operating media, in other words, the reactants, the fuel cell stack has, on the one hand, an anode supply system and, on the other hand, a cathode supply system. The anode supply system comprises an anode supply path for feeding an anode operating gas into the anode spaces, and an anode exhaust gas path for discharging an anode exhaust gas out of the anode spaces. By the same token, the cathode supply system comprises a cathode supply path for feeding a cathode operating gas into the cathode spaces, and a cathode exhaust gas path for discharging a cathode exhaust gas out of the cathode spaces of the fuel cell stack.

The operation of a fuel cell stack requires a number of peripheral components (auxiliary aggregates). Examples of these include air compressors, recirculation fans, cooling water pumps, valves, sensors, etc. The power consumption of these components is referred to as parasitic consumption since, even though this energy has to be provided by the fuel cell stack, it is not available for external consumers. Since the power available to external consumers is diminished by the parasitic current, the total efficiency of the fuel cell system $\eta_{Sys}$ is always below the efficiency of the fuel cell stack $\eta_{FC}$ (see FIG. 2). Here, in case of a low load (corresponding to a low power withdrawal), the efficiency of the system $\eta_{Sys}$ drops disproportionally due to the peripheral components that are being operated.

During the operation of the fuel cell stack, it is necessary to avoid high cell voltages and not to fall below appertaining minimum limits for the withdrawn power or load since this can lead to a degradation of the catalytic material of the cathode and anode of the cells. For this reason, as a rule, the fuel cell stack is only operated to an output minimum (operating point C in FIG. 2) and this is then maintained as the idling state. If power requirements are even lower or absent, it is desirable to temporarily switch off the fuel cell stack. This is why fuel cells are controlled in a so-called start-stop mode of operation in order to temporarily put them in a standby mode. The change-over from normal operation—in which the stack is operated with the cathode and anode operating gases while load or power is being withdrawn—to the standby mode (also referred to as the sleep mode) is the subject matter of the present application.

In today's systems, as rule, the change-over to the standby mode is done by switching off the compressor in order to interrupt the feed of cathode gas. Subsequently, the reactants contained in the fuel cell stack finish reacting, as a result of which electric energy is generated that is then withdrawn from the fuel cell stack as discharge current as a function of the voltage until the chemical reactions come to an end. Once a cell voltage of, for instance, 0.4 V per individual cell has been reached, the discharging procedure is terminated so that the fuel cell stack does not reach a degradation-critical state. In order to prevent an excessive pressure differential between the anode side and the cathode side, which could cause damage to the membrane, modern strategies prescribe that the fuel cell stack is only changed over to the standby mode out of operating points involving low gas pressures, in other words, low load withdrawals.

European patent specification EP 2 564 459 B1 describes a method for operating a fuel cell system in which the efficiency of the fuel cell system is ascertained and the system is changed over to a standby mode when a lower limit value is reached.

German patent application DE 10 2009 001 630 A1 discloses that, if the power requirements are low or absent, the fuel cell system is first operated at the point of the best system efficiency in order to charge the battery, after which it is changed over to the standby state. For this purpose, the air compressor is switched off and a target voltage value for the direct voltage network connected to the fuel cell stack is set to a non-critical value. In the meantime, the anode gas feed remains active in order to diminish the oxygen on the cathode side.

German patent application DE 10 2004 034 071 A1 describes a method for switching off a fuel cell system. In order to do so, first of all, an idling pressure of, for example, 1.6 bar is set at the anode and subsequently the anode feed is interrupted. Through the application of a load that is specified as a function of the desired duration of the switchoff procedure, hydrogen is consumed while power is generated. The cathode pressure is adapted in such a way that a maximum pressure differential between the anode and the cathode does not exceed a critical value of, for instance, 0.2 bar. If a prescribed low voltage is reached in the fuel cell, the load withdrawal is stopped. The compressor for conveying air is not switched off until the anode pressure has reached the ambient pressure.

SUMMARY OF THE INVENTION

It is an object of the present invention to provide a method for changing a fuel cell system from the normal mode over to a standby mode, said method entailing the lowest possible energy losses, that is to say, a high level of fuel utilization. Preferably, the method for changing over to the standby mode should also allow the transition to the standby mode from high load points (high gas pressures).

The present invention provides a fuel cell system having a fuel cell stack comprising cathode spaces and anode spaces. The fuel cell system also has an anode supply system to feed an anode operating gas, especially hydrogen, into the anode spaces of the fuel cell stack or to discharge such a gas out of them. The system also has a cathode supply system to feed a cathode operating gas, especially oxygen or a gas mixture containing oxygen such as air, into the cathode spaces of the stack as well as to discharge such a gas out of them. The system also comprises an external electric circuit via which the fuel cell stack is connected or can be connected to an external power network and/or to a consumer. The method according to the invention comprises the following steps:

a) reducing the load withdrawal—via the electric circuit of the fuel cell stack—down to a load within the range from −1% to +5% around a load with an optimal system efficiency ($L_{opt}$) at which the fuel cell system exhibits a maximum efficiency, b) regulating down or controlling down the anode pressure by means of the anode supply system (20) so that the anode operating pressure is gradually reduced, c) in the meantime, maintaining and controlling the cathode gas feed by means of the cathode supply system in such a way that the pressure differential that sets in between the anode spaces and the cathode spaces does not exceed a prescribed maximum pressure differential, d) switching off the cathode gas feed if the pressure differential between the anode spaces of the fuel cell stack and the environment has reached the prescribed maximum pressure differential, and e) switching off the load withdrawal by means of the external electric circuit at the latest when a prescribed minimum limit voltage of the fuel cell stack has been reached.

Therefore, for purposes of changing over to the standby mode, the fuel cell stack is first operated at an operating point that is essentially optimal in terms of the system efficiency, and this is done by means of a systematic load point shift (step a), and then, in this intermediate state, the fuel cell stack is discharged due to the chemical reaction of the gradually ramped-down anode gas (fuel) by means of the adapted cathode operating gas (simultaneous steps b and c). In this manner, at a very high degree of efficiency (and thus with slight heat generation), the fuel that is still fed to the fuel cell stack is utilized for the generation of electric energy. Especially owing to the fact that the anode pressure in the anode spaces is regulated down or controlled down in step b), the anode pressure drops especially continuously. In the meantime, the cathode pressure is adapted, in other words, likewise gradually reduced, in order to ensure that an acceptable pressure differential is maintained over the membrane so that damage to the latter can be prevented. In particular, the cathode pressure is controlled in the meantime as a function of the anode pressure that sets in, and this is done in such a way that the maximum pressure differential is not exceeded. Only once the anode pressure has fallen to such an extent that the pressure differential vis-à-vis the environment is safe is the cathode gas feed switched off so that the cathode spaces reach the ambient temperature. After the cathode gas feed has been switched off in step (d), the stack is further discharged in that the remaining oxygen finishes reacting in the cathode spaces, thereby generating electric energy that continues to be withdrawn from the stack. Once the lower voltage limit of the stack is reached in step (e), for example, at a voltage of 0.4 V per individual cell, the load withdrawal is terminated. This prevents damage to the stack due to degradation of the catalytic material (platinum dissolution).

As a result of the discharging of the stack at a high efficiency, it is ensured that the system is changed over to the standby mode with the best possible utilization of the fuel. The fuel present in the anode spaces is utilized at a high efficiency for the generation of electric energy. Moreover, shifting the load point to the intermediate state that is optimal in terms of the efficiency makes it possible to change over the system even from higher load points or from higher operating pressures since the operating pressures in the anode and cathode spaces are only subsequently gradually diminished or adapted.

According to the invention, in step (a), there is a reduction in the load withdrawal of the fuel cell stack down to a load within the range from −1% to +5% around a load with an optimal system efficiency at which the fuel cell system exhibits a maximum efficiency. Preferably, the load is set to a value that is within the range from −0.7% to +3%, especially from −0.5% to +1%, around the load with an optimal system efficiency relative to the maximum permissible load. Especially preferably, the load is, as precisely as possible, at the load with an optimal system efficiency. In this manner, the efficiency is improved further when the stack is ramped down, in other words, the chemical energy of the fuel is utilized even better for the generation of electric energy.

In a preferred embodiment of the invention, the electric energy of the fuel cell stack that has been generated in order to switch off the power withdrawal from the stack in step (e) is fed to an electric consumer or to a battery that is connected to the fuel cell stack via the electric circuit. The consumer can be an auxiliary aggregate of the fuel cell system, for instance, pumps, valves, sensors, etc. As an alternative or in addition, the electric energy can be fed to an external consumer, for example, an electric component of a vehicle. In this manner, the generated electricity of the fuel cell system can be utilized optimally and flexibly, preferably in order to charge a battery, for instance, a traction battery, of a vehicle.

Preferably, the procedure of switching off the cathode gas feed in step (d) encompasses the switching off of a conveying device for the cathode operating gas, particularly a compressor. In most fuel cell systems, such conveying devices usually constitute those peripheral components or auxiliary aggregates that entail the highest parasitic energy consumption. Therefore, switching off the conveying device further increases the efficiency of the system, namely, almost to the efficiency level of the fuel cell stack.

Especially advantageously, a recirculation of the anode operating gas is maintained while the anode pressure is being controlled down or regulated down and while the cathode gas feed is being simultaneously maintained and adapted in steps (b) and (c) of the method. The recirculation of the fuel for the fuel cell by means of a recirculation line which connects the anode exhaust gas path to the anode supply path and which thus once again feeds unconsumed fuel to the fuel cell stack is implemented in most systems nowadays in order to utilize the fuel that is employed more than stoichiometrically. Owing to the fact that the recirculation is maintained, the remaining hydrogen present in the recirculation line continues to flush homogenously through the anode spaces of the stack and is used to generate energy.

The prescribed maximum pressure differential between the anode spaces and the cathode spaces of the stack, which is not exceeded during the execution of the method, is selected in such a way as to prevent mechanical damage to the polymer electrolyte membrane of the individual fuel cells of the stack. Depending on the concrete design of the stack, especially of its membrane-electrode units, the maximum pressure differential is within the range from 0.1 bar to 0.3 bar, especially within the range from 0.15 bar to 0.25 bar, in today's systems at approximately 0.17 bar to 0.2 bar.

Another aspect of the present application relates to a fuel cell system comprising a fuel cell stack that has anode spaces and cathode spaces, an anode supply system, a cathode supply system as well as an external electric circuit. The fuel cell system is configured to carry out the method according to the invention. For this purpose, the fuel cell system preferably comprises a control unit in which a computer-readable program algorithm for carrying out the method is stored. The control unit can also comprise the family of characteristics and additional data which the algorithm accesses.

Another aspect of the invention relates to a vehicle having a fuel cell system according to the present invention. The vehicle is preferably an electrically powered vehicle whereby the fuel cell system or a battery charged by such a system provides the electric energy needed to drive it.

Unless otherwise indicated, the various embodiments of the invention put forward in this application can be advantageously combined with each other.

BRIEF DESCRIPTION OF THE DRAWINGS

The invention will be described below in embodiments on the basis of the accompanying drawings. The following is shown:

FIG. 1 shows a fuel cell system designated in its entirety by the reference numeral 100, according to an advantageous embodiment of the invention.

DETAILED DESCRIPTION

Figure 1:
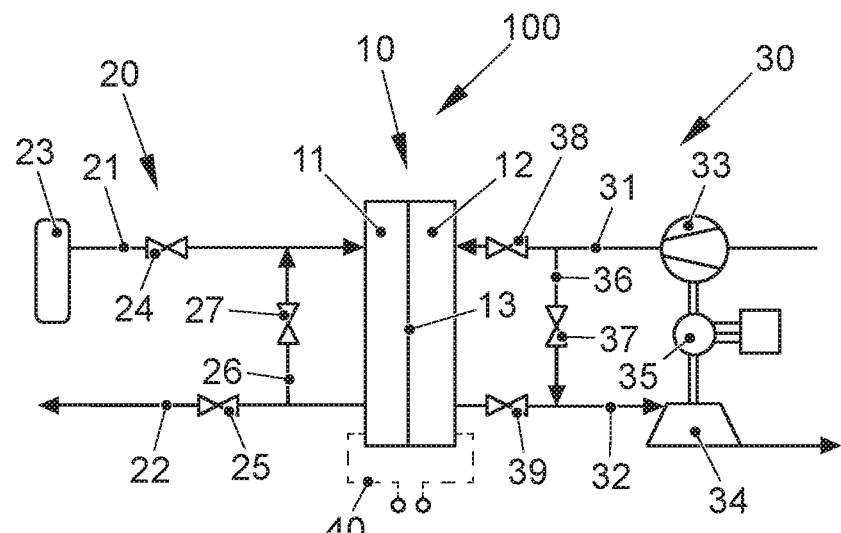
FIG. 1 a fuel cell system in a first embodiment.

As its core component, the fuel cell system 100 comprises a fuel cell stack 10. The fuel cell stack 10 has a plurality of stacked individual cells, of which only one is indicated here by way of an example. Each individual cell comprises an anode space 11 as well as a cathode space 12 that are separated from each other by an ion-conductive polymer electrolyte membrane 13. The anode and cathode spaces 11, 12 each have a catalytic electrode, namely, the anode or the cathode, which catalyze the appertaining partial reaction of the fuel cell reaction. Between two such membrane electrode units, there is also a bipolar plate that serves to feed the operating media into the anode and cathode spaces 11, 12 and that also establishes the electric connection between the individual fuel cells.

In order for the fuel cell stack 10 to be supplied with the operating gases, the fuel cell system 100 has an anode supply system 20 on the one hand, and a cathode supply system 30 on the other hand.

The anode supply system 20 comprises an anode supply path 21 that serves to feed an anode operating gas, for example, hydrogen, into the anode spaces 11. For this purpose, the anode supply path 21 connects a fuel reservoir 23 to the fuel cell stack 10. A regulating means 24 arranged in the anode supply path 21 serves to regulate the mass flow of the fuel. The regulating means 24 is configured, for instance, as a control valve. The anode supply system 20 also comprises an anode exhaust gas path 22 that discharges the anode exhaust gas out of the anode spaces 11 of the fuel cell stack 10. Moreover, the anode supply system 20 has a recirculation line 26 with another regulating means 27 that connects the anode exhaust gas path 22 to the anode supply path 21. The recirculation of fuel is a conventional process to return and to utilize the fuel, which is usually employed more than stoichiometrically. FIG. 1 does not show an optional conveying device which effectuates the circulation of the recirculated anode gas.

The cathode supply system 30 comprises a cathode supply path 31 that feeds a cathode operating gas containing oxygen into the cathode spaces 12 of the stack 10. The cathode operating gas is preferably air. In order to convey and compress the air, there is a compressor 33 in the cathode supply path 31. A cathode exhaust gas path 32 conveys the cathode exhaust gas (exhaust air) out of the cathode spaces 12 and, if applicable, conveys it to an exhaust gas system (not shown here). The compressor is driven by an electric motor 35. Optionally, as shown here, the compressor 33 can be driven with the assistance of a turbine 34 that is arranged in the cathode exhaust gas path 32. In this context, the compressor 33 and the turbine 34 are connected to each other via a shared shaft.

A wastegate line 36 that branches off from the cathode supply path 31 connects the cathode supply path 31 to the cathode exhaust gas path 32. The wastegate line 36 serves to bypass the fuel cell stack 10 when the compressed cathode operating gas is not needed, for example, during low-load phases in the fuel cell stack 10, but when the compressor 33 nevertheless is not supposed to be ramped down. Optionally, a regulating means 37 that is configured, for instance, as a flap or as a control valve can be arranged in the wastegate line 36. The mass flow passing through the wastegate line 36 is regulated by the regulating means 37, thereby regulating the output of the fuel cell stack 10.

Another regulating means 38 can be arranged in the cathode supply path 31, preferably downstream from the branch-off site of the wastegate line 36. Yet another regulating means 39 can be present in the cathode exhaust gas path 32, preferably upstream from an entry site of the wastegate line 36. The regulating means 38, 39 are likewise configured as flaps or as valves and they allow the separation of the cathode spaces 12 of the fuel cell stack 10 from the environment, for example, when the stack 10 is supposed to be switched off.

In a variation of the embodiment shown, the anode exhaust gas path 22 can open up into the cathode exhaust gas path 32 so that anode and cathode exhaust gas can be transported away for a shared exhaust gas after-treatment.

Several additional individual details of the anode and cathode supply systems 20, 30 are not depicted in FIG. 1 for the sake of clarity. In particular, the cathode supply system 30 can have a humidifier in which the cathode operating gas that is to be humidified is humidified by the cathode exhaust gas via a water vapor-permeable membrane. Moreover, the cathode supply system 30 can have a heat exchanger that serves to pre-heat the air that has been compressed by the compressor 33. The warm exhaust air stemming from the cathode spaces 12 normally flows as a heat carrier through the heat exchanger. In this process, the heat exchanger can be bypassed by an appropriate bypass line on the side of the cathode supply path 31 as well as on side of the cathode exhaust gas path 32. There can also be a turbine bypass line that bypasses the turbine 34 on the side of the cathode exhaust gas path 32. Furthermore, systems without a turbine 34 are also known. Moreover, a water separator can be installed in the anode and/or cathode exhaust gas path 32 in order to condense and drain the product water generated by the fuel cell reaction.

The fuel cell system 100 also comprises an external electric circuit 40 that connects the fuel cell stack 10 to an external power system (not shown here) such as, for instance, the electrical system of a vehicle. A number of electric consumers can be connected to the electrical system, especially an electric traction motor for an electric vehicle and/or a battery. By the same token, the electrical peripheral components of the fuel cell system 100, especially the compressor 33, can be supplied via the system. Preferably, the electric circuit 40 is connected to the external power system via a switch with which it can be disconnected.

The fuel cell system 100 shown in FIG. 1 has the following function:

During normal operation of the fuel cell stack 10, that is to say, as long as electric power in being demanded and tapped from the fuel cell stack 10 via the electric circuit 40, the anode spaces 11 of the stack are supplied with the anode operating gas, especially hydrogen, via the anode supply path 21, and the anode gas is discharged via the anode exhaust gas path 22 and at least partially recirculated via the line 26. In this context, the regulating means 25 is only opened occasionally in order to prevent the anode operating gas from becoming enriched with nitrogen, water vapor, etc. At the same time, the cathode operating gas (air) is conveyed out of the environment via the compressor 33 and compressed, after which it is fed into the cathode spaces 12 of the fuel cell stack 10. The cathode gas is discharged via the cathode exhaust gas path. The wastegate regulating means 37 is closed or else partially or completely opened, depending on the load point of the system. During normal operation, the operating pressures in the anode and cathode spaces 11, 12 are kept within the range of, for example, 1.1 bar to 3 bar, depending on the load or output. In this process, the anode pressure is typically set at a slightly higher value than the cathode pressure, for instance, approximately 0.2 bar higher.

Figure 2:
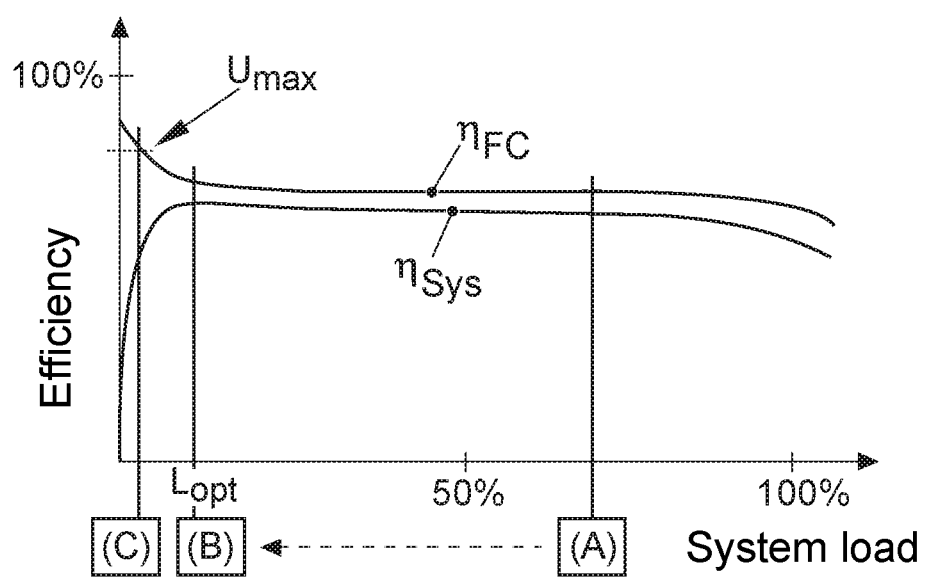
FIG. 2 a curve of the efficiency of a fuel cell stack ($\eta_{FC}$) and of a fuel cell system ($\eta_{Sys}$) as a function of the output/load.

FIG. 2 shows the load-dependent curves of a fuel cell stack ($\eta_{FC}$) as well as of a fuel cell system ($\eta_{Sys}$) which comprises electric peripheral components that consume electric energy (parasitic energy) for their own operation, thus reducing the total efficiency of the system in comparison to the efficiency of the fuel cell over the entire operating range. The current-voltage curve of the fuel cell (not shown here) is similar to the curve $\eta_{FC}$ of the fuel cell stack in FIG. 2. It can be seen that, at a low load of the system, the efficiency of the stack (as well as its voltage) rises somewhat, but the higher efficiency of the stack is overcompensated by a relatively high consumption on the part of the peripheral components, so that the efficiency of the entire system at low loads drops considerably.

FIG. 2 also shows an upper limit voltage $U_{max}$ which, if it is exceeded, can cause damage to the fuel cell due to degradation of the catalytic material, and this can lead to cell ageing. For this reason, the value during the operation of fuel cells is not allowed to fall below a lower output limit (indicated here by the operating point (C)). Rather, when the lower output limit or the upper limit voltage $U_{max}$ is reached, the fuel cell stack is changed over to a standby mode from which the fuel cell can be quickly ramped up again (start-stop mode).

In the state of the art, the transition to the standby mode takes place in that, when the lower output limit (C in FIG. 2) is reached, the air feed into the cathode spaces is interrupted and the oxygen present in the cathode spaces finishes reacting with the fuel (hydrogen) that has been additionally added. In the meantime, there is an additional discharge of electric power out of the stack until the chemical reaction has come to an end. In this process, the discharging process is controlled via a voltage-dependent discharge current. At a constant voltage, the discharge current decreases due to an inadequate supply of oxygen. In the state of the art, the change-over to the standby mode takes place exclusively from points at a low system load and thus at low operating pressures in the fuel cell stack so that the pressure differential over the membrane cannot rise above an overcritical value when the air supply is switched off.

Figure 3:
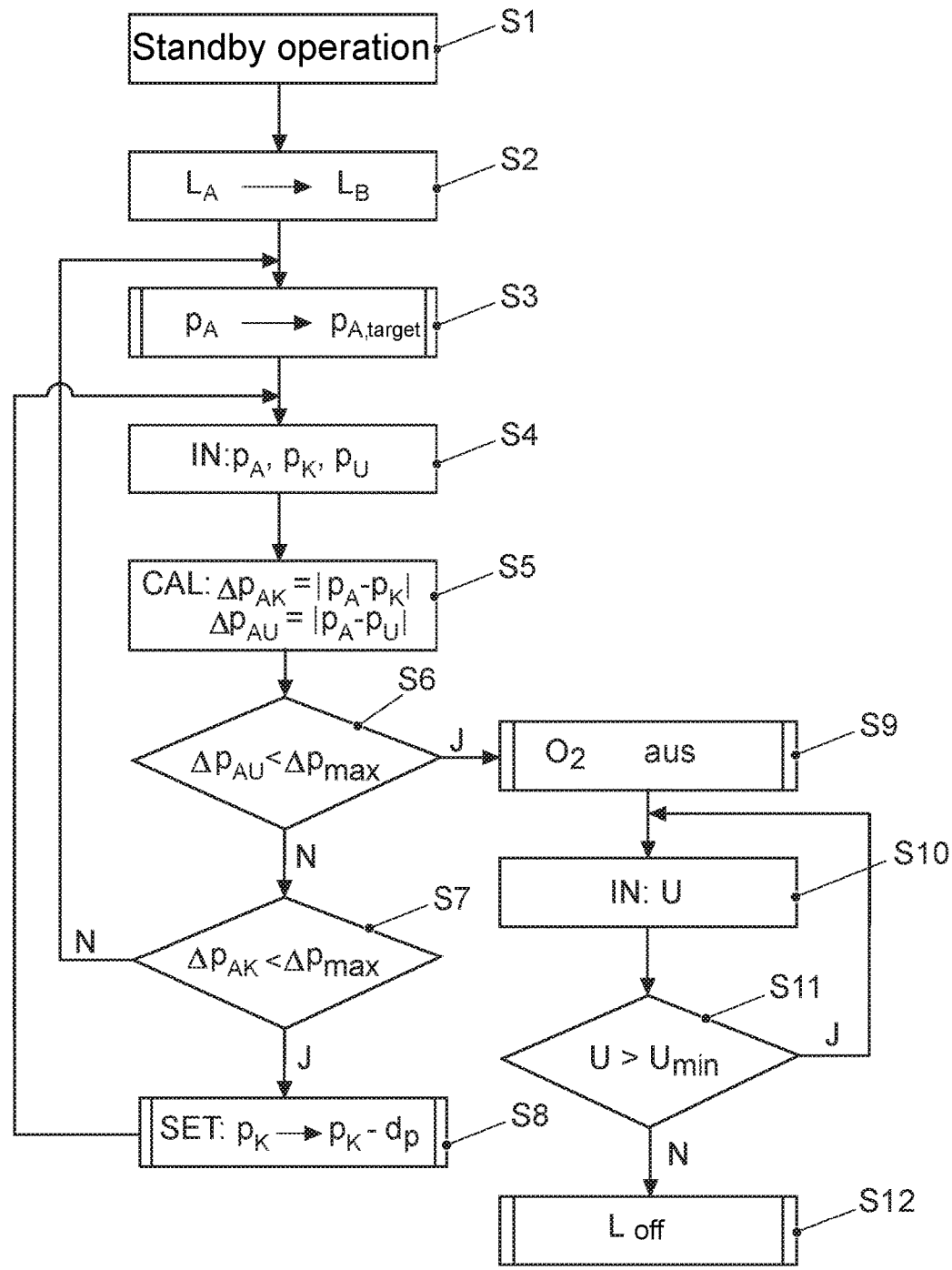
FIG. 3 a flow chart of the method sequence for changing a fuel cell system from a normal mode of operation over to standby mode of operation according to an embodiment of the invention.

The sequence of the method according to the invention for changing a fuel cell system over to a standby mode according to a preferred embodiment is shown in the flowchart of FIG. 3.

The method starts in step S1, in which the presence of a standby condition is ascertained. This condition can be, for instance, the standstill of the vehicle without the ignition having been switched off, for example, stopping at a traffic light or the overrun mode of the vehicle.

If such a standby condition is present, the method proceeds to step S2, in which the changing of the fuel cell over to the standby mode begins. Starting from a load point $L_A$ during normal operation, which is shown by way of an example with the operating point (A) in FIG. 2, the load withdrawn via the electric circuit is reduced to a load $L_B$ (see operating point (B) in FIG. 2). Here, the load $L_B$ is a load that corresponds essentially to a load with an optimal system efficiency ($L_{opt}$) of the fuel cell system 100 (lower curve in FIG. 2). In particular, the withdrawn load is set as precisely as possible ($L_B=L_{opt}$) to the load with an optimal system efficiency ($L_{opt}$).

Then, in step S3, a systematic ramping down of the anode pressure $p_A$ begins, so that, at a reduced load withdrawal, the anode operating pressure is gradually reduced to such an extent that sufficient fuel is present for the electrochemical reaction. This is done especially in accordance with a prescribed target-pressure curve, which is shown by way of an example with the curve $p_A$ in FIG. 4. The ramping down of the anode pressure $p_A$ can be controlled or regulated, preferably regulated by means of the regulating means 24 configured as a control valve of the anode supply system 20 (see FIG. 1). During the ramping down of the anode pressure $p_A$, the regulating means 25 arranged in the anode exhaust gas line 22 is preferably closed by appropriately actuating the regulating means 24, while the regulating means 27 in the recirculation line 26 remains open. In this manner, the anode recirculation is kept active. The cathode gas supply is maintained at the same time.

In the subsequent step S4, the anode pressure $p_A$ that is present or that is established in the anode spaces 11, the cathode pressure $p_K$ as well as the ambient pressure $p_U$ are all read in.

In step S5, the pressure differential $\Delta p_{AK}$ between the momentary anode pressure $p_A$ and the momentary cathode $p_K$ is calculated, and so is the calculated pressure differential $\Delta p_{AU}$ between the anode pressure and the ambient pressure.

In the subsequent query S6, it is checked whether the previously ascertained pressure differential $\Delta p_{AU}$ between the anode pressure and the ambient pressure is equal to or smaller than a prescribed maximum pressure differential $\Delta p_{max}$ of, for instance, 0.2 bar. At the beginning of the method, in which the anode pressure $p_A$ is normally still at a relatively high level, the response to the query is "no", so that the method proceeds to the next query in step S7.

In step S7, it is checked whether the pressure differential $\Delta p_{AK}$ between the anode pressure $p_A$ and the cathode pressure $p_k$ is equal to or smaller than the maximum pressure differential $\Delta p_{max}$. If the response to this query is "no", the anode pressure $p_A$ is consequently still too high, and the method returns to step S3, where the anode pressure is regulated further down and subsequently, in step S4, the differing pressures are once again ascertained and read in. If, in contrast, the answer to the query S7 is "yes", that is to say, if the pressure differential between the anode and cathode spaces of the fuel cell is sufficiently small, then the method proceeds to step S8.

In step S8, the cathode target pressure is reduced by a prescribed predetermined increment dp. This can be done in that the output of the compressor 33 is correspondingly reduced or, in the case of a constant operation of the compressor, in that the wastegate line 36 is opened by partially opening the valve 37. Subsequently, the method returns to S4, where the differing pressures are once again read in.

During the cyclical execution of steps S3 through S8, the hydrogen that is fed in to the system in a diminished quantity is converted by the fuel cell reaction. In this process, the anode pressure $p_A$ is gradually reduced and the cathode pressure $p_K$ is adapted at a constant distance from it which essentially corresponds to the maximum pressure differential $\Delta p_{max}$. This can be seen in FIG. 4, in which the anode and cathode pressures $p_A$ and $p_K$ are depicted as a function of the time t. During normal operation, up to a point in time $t_1$, while the fuel cell system is being operated at a correspondingly high output, the pressures $p_A$ and $p_K$ are at a correspondingly high level. In this context, the anode is always operated at a certain low excess pressure with respect to the cathode. At the point in time $t_1$, the method starts to change the fuel cell over to the standby mode in that the load point is shifted from $L_A$ over to the efficiency-optimized load $L_B = L_{opt}$ and the anode gas feed is switched off. Starting at the point in time $t_1$, the anode pressure $p_A$ is continuously ramped down and the fed-in fuel continues to react chemically. The cathode pressure $p_K$ is continuously adapted to the anode pressure $p_A$ in such a way that the pressure differential $\Delta p_{AK}$ between the anode spaces and the cathode spaces of the fuel cell stack 10 does not exceed the maximum pressure differential $\Delta p_{max}$.

The cycles S3 through S8 in FIG. 3 are carried out until the anode pressure $p_A$ has sunk to such an extent that the pressure differential $\Delta p_{AU}$ with respect to the ambient pressure is equal to or smaller than the maximum pressure differential $\Delta p_{max}$. As soon as this is the case, the answer to the query in step S6 is "yes" and the method proceeds to step S9, where the cathode gas feed to the fuel cell stack 10 is switched off. This is done by switching off the compressor 33.

Subsequently, in step S10, the momentary voltage U of the fuel cell stack 10 (alternatively the output or load) is read in. In step S11, it is checked whether the momentary voltage U has already reached a prescribed minimum limit voltage $U_{min}$. As long as this is not the case and thus the answer to the query in step A11 is "yes", the method returns to step S10, whereby the appertaining parameters are once again read in.

As soon as the cell voltage U has reached the minimum limit voltage $U_{min}$, the method proceeds to step S12, whereby the load withdrawal from the fuel cell stack 10 via the electric circuit 40 is terminated. This ends the method and the fuel cell system 100 is in the standby mode.

Figure 4:
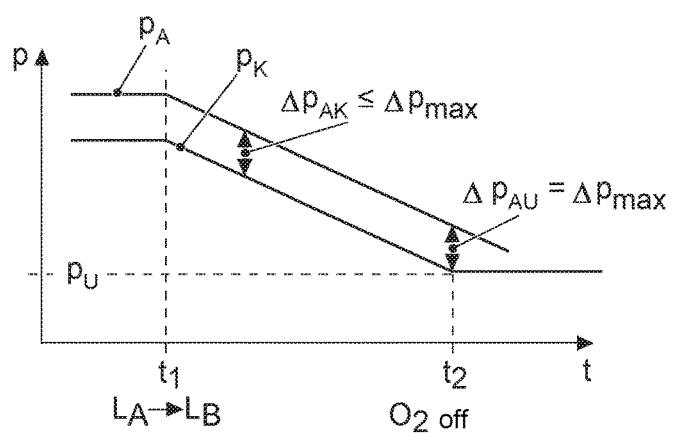
FIG. 4 a schematic depiction of the anode and cathode pressures of a fuel cell stack during the course of the method according to the invention.

The time when the maximum pressure differential between the anode spaces 11 of the stack and the environment has been reached is indicated by the point in time $t_2$ in FIG. 4. At this point in time, according to the explained method, the air feed is switched off. As a result, the cathode pressure $p_K$ is established at the value of the ambient pressure $p_U$. The anode pressure $p_A$, in contrast, continues to drop since hydrogen continues to be reacted.

If the system is to be shut down completely, for instance, because the vehicle is to be parked (the ignition is switched off), all of the peripheral and control devices of the system are switched off. Moreover, additional measures can be taken in order to generate and maintain an inert atmosphere in the anode and cathode spaces of the stack 10. In particular, the anode and cathode spaces 11 and 12 are segregated from the environment in that the regulating means 24, 25, 38 and 39 are closed.

LIST OF REFERENCE NUMERALS 100 fuel cell system
10 fuel cell stack
11 anode space
12 cathode space
13 polymer electrolyte membrane
20 anode supply system
21 anode supply path
22 anode exhaust gas path
23 fuel tank
24 regulating means/valve
25 regulating means
26 recirculation line
27 regulating means/valve
30 cathode supply system
31 cathode supply path
32 cathode exhaust gas path
33 conveying device/compressor
34 turbine
35 electric motor
36 wastegate line
37 wastegate regulating means
38 regulating means/valve 39 regulating means/valve
40 external power circuit
$p_A$ pressure in the anode space, anode pressure
$p_K$ pressure in the cathode space, cathode pressure
$p_U$ ambient pressure
$\Delta p_{AK}$ pressure differential between the anode pressure and the cathode pressure
$\Delta p_{AU}$ pressure differential between the anode pressure and the ambient pressure
U voltage
L load or output
$\eta_{FC}$ efficiency of the fuel cell stack
$\eta_{Sys}$ efficiency of the fuel cell system

What is claimed is:

1. A method for changing a fuel cell system from a normal mode of operation over to a standby mode, the fuel cell system having a fuel cell stack comprising cathode spaces and anode spaces, an anode supply system, a cathode gas supply system as well as an external electric circuit, a maximum efficiency of the fuel cell system being exhibited at a first load, the first load defining an optimal system efficiency load, the method comprising the following steps:
   a) reducing a load—via the electric circuit of the fuel cell stack—down to a load within a range from −1% to +5% of the optimal system efficiency load,
   b) regulating or controlling an anode pressure down via the anode supply system so that an anode operating pressure is reduced,
   c) in the meantime, maintaining and controlling a cathode gas feed via the cathode supply system in such a way that a pressure differential that sets in between the anode spaces and the cathode spaces does not exceed a prescribed maximum pressure differential,
   d) switching off the cathode gas feed if a further pressure differential between the anode spaces and of the fuel cell stack and an environment has reached the prescribed maximum pressure differential, and
   e) switching off the load via the external electric circuit at the latest when a prescribed minimum limit voltage of the fuel cell stack has been reached.

2. The method as recited in claim 1 wherein an electric energy of the fuel cell stack generated to switch off the power withdrawal from the stack in step (e) is fed to an electric consumer or to a battery connected to the fuel cell stack via the electric circuit.

3. The method as recited in claim 2 wherein the electric consumer is an auxiliary aggregate of the fuel cell system or an external consumer.

4. The method as recited in claim 1 wherein the switching off the cathode gas feed includes switching off a conveying device for a cathode operating gas.

5. The method as recited in claim 4 wherein the conveying device is a compressor.

6. The method as recited in claim 1 wherein a recirculation of the anode operating gas is maintained while the anode pressure is being controlled or regulated in step (b) and while the cathode gas feed is being maintained in step (c).

7. The method as recited in claim 1 wherein the load set in step (a) is within the range from −0.7% to +3% of the optimal system efficiency load.

8. The method as recited in claim 7 wherein the load set in step (a) is within the range from −0.5% to +1% of the optimal system efficiency load.

9. The method as recited in claim 1 wherein the prescribed maximum pressure differential is within a range from 0.1 bar to 0.3 bar.

10. The method as recited in claim 1 wherein the prescribed maximum pressure differential is within a range from 0.15 bar to 0.25 bar.

11. A fuel cell system with a fuel cell stack comprising:
    cathode spaces and anode spaces;
    an anode supply system;
    a cathode gas supply system; and
    an external electric circuit the fuel cell system performing the method as recited in claim 1.

12. The method as recited in claim 1 wherein during the regulating or controlling the anode pressure down via the anode supply system, the anode operating pressure is reduced linearly.

* * * * *